(12) United States Patent
Wong et al.

(10) Patent No.: US 12,498,780 B2
(45) Date of Patent: Dec. 16, 2025

(54) DYNAMIC PLUGGABLE MODULE POWER MANAGEMENT

(71) Applicant: HEWLETT PACKARD ENTERPRISE DEVELOPMENT LP, Springs, TX (US)

(72) Inventors: Sheau Shian Wong, Singapore (SG); Rupal Bhavin Shah, Roseville, CA (US); David A. Kumpf, Rocklin, CA (US); Rachel Callison, Sacramento, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 160 days.

(21) Appl. No.: 18/161,257

(22) Filed: Jan. 30, 2023

(65) Prior Publication Data

US 2024/0256026 A1 Aug. 1, 2024

(51) Int. Cl.
*G06F 1/00* (2006.01)
*G06F 1/3296* (2019.01)
*G06F 1/3203* (2019.01)

(52) U.S. Cl.
CPC .......... *G06F 1/3296* (2013.01); *G06F 1/3203* (2013.01)

(58) Field of Classification Search
CPC ...... G06F 1/3296; G06F 1/206; G06F 1/3206; G06F 11/3058; G06F 1/266; G06F 1/3215; G06F 11/3041
USPC ........................................................ 713/323
See application file for complete search history.

(56) References Cited

U.S. PATENT DOCUMENTS

| | | | |
|---|---|---|---|
| 6,247,109 B1 | 6/2001 | Kleinsorge et al. | |
| 9,367,004 B2* | 6/2016 | Naruse | G03G 15/205 |
| 9,432,169 B2 | 8/2016 | Goodson et al. | |
| 9,459,927 B2 | 10/2016 | Carroll et al. | |
| 9,544,222 B2 | 1/2017 | Charette et al. | |
| 9,960,962 B2 | 5/2018 | Hamber et al. | |
| 10,592,382 B2 | 3/2020 | Kuster | |
| 11,010,088 B2 | 5/2021 | Loce et al. | |
| 2005/0223256 A1* | 10/2005 | Watts, Jr. | G06F 1/3203 713/322 |
| 2009/0044027 A1* | 2/2009 | Piazza | H05K 7/20836 713/300 |
| 2012/0116696 A1 | 5/2012 | Wank | |
| 2013/0249297 A1* | 9/2013 | Takehara | H02S 50/10 307/71 |
| 2014/0007097 A1 | 1/2014 | Chin et al. | |
| 2014/0013013 A1* | 1/2014 | Herrity | G06F 11/3051 710/18 |
| 2014/0067139 A1* | 3/2014 | Berke | G06F 1/26 700/291 |

(Continued)

*Primary Examiner* — Volvick Derose
(74) *Attorney, Agent, or Firm* — Jones Robb PLLC

(57) ABSTRACT

An electronic device may comprise a number of ports configured to removably receive pluggable modules, such as optical transceivers. The electronic device may also comprise processing circuitry comprising a power management engine. The power management engine may be configured to monitor system properties of the electronic device, port properties of the ports, and/or pluggable module properties of any pluggable modules installed in the ports. The power management engine may further be configured to dynamically select a high-power mode or a low-power mode for each of the pluggable modules installed in the ports based on the monitored properties.

18 Claims, 6 Drawing Sheets

(56) References Cited

U.S. PATENT DOCUMENTS

| | | | |
|---|---|---|---|
| 2014/0245031 A1* | 8/2014 | Hamdi | H04L 12/40045 |
| | | | 713/300 |
| 2015/0281041 A1* | 10/2015 | Retana | H04L 41/0833 |
| | | | 370/255 |
| 2017/0141608 A1* | 5/2017 | Stenger | H02J 7/0045 |
| 2017/0201050 A1* | 7/2017 | Akita | H01B 11/00 |
| 2017/0228328 A1 | 8/2017 | Armstrong et al. | |
| 2017/0277146 A1* | 9/2017 | Uchida | H05K 7/20736 |
| 2018/0232021 A1* | 8/2018 | Perchlik | G06F 1/206 |
| 2019/0237829 A1* | 8/2019 | Lo | H01M 10/052 |
| 2019/0304630 A1* | 10/2019 | Goergen | H01B 9/003 |
| 2020/0393885 A1* | 12/2020 | Ghosh | G06F 1/206 |

* cited by examiner

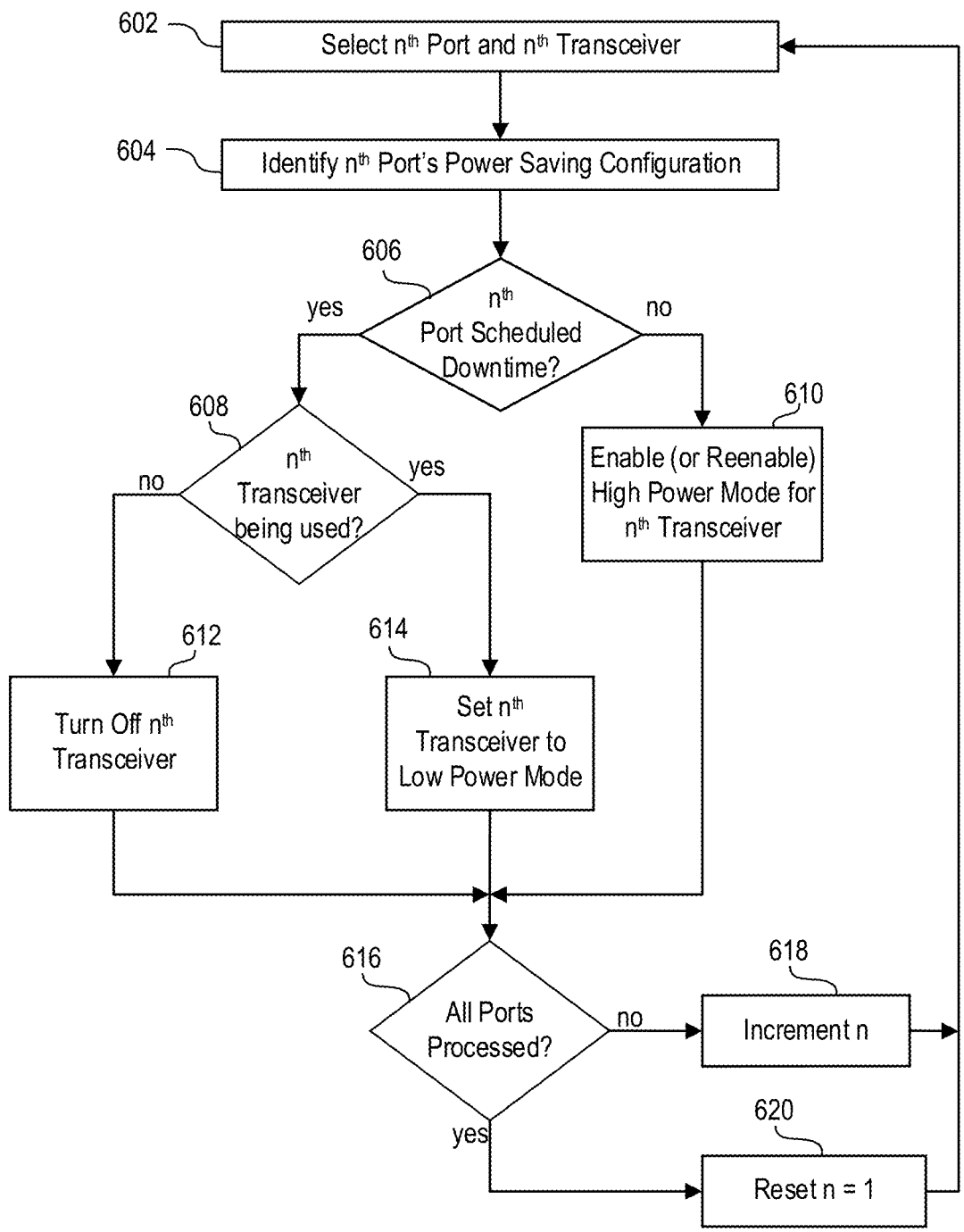

DYNAMIC PLUGGABLE MODULE POWER MANAGEMENT

INTRODUCTION

Some electronic devices, such as computers, networking devices, etc., have ports arranged to removably receive (e.g., in a hot-pluggable manner in some cases) pluggable auxiliary devices, which are sometimes called pluggable modules. The ports, also referred to as bays or slots, may each comprise a receptacle to receive the auxiliary device and one or more connectors disposed in the receptacle to mate with complementary connector(s) of the pluggable auxiliary device to establish an electronic, optical, or other connection through which signals can be communicated. Non-limiting examples of pluggable auxiliary devices include pluggable optical transceivers (e.g., Quad Small Form-Factor Pluggable (QSFP) connectors, Octal Small Form-Factor Pluggable (OSFP) connectors, etc.), PCIe cards, Solid State Drives (SSD) such as NVMe or M.2 SSDs, hard disk drives, power supplies, and other similar devices.

BRIEF DESCRIPTION OF THE DRAWINGS

The present disclosure can be understood from the following detailed description, either alone or together with the accompanying drawings. The drawings are included to provide a further understanding of the present disclosure and are incorporated in and constitute a part of this specification. The drawings illustrate one or more examples of the present teachings and together with the description explain certain principles and operation. In the drawings:

FIG. 6 is a process flow diagram illustrating a fifth example method.

DETAILED DESCRIPTION

Figure 1:
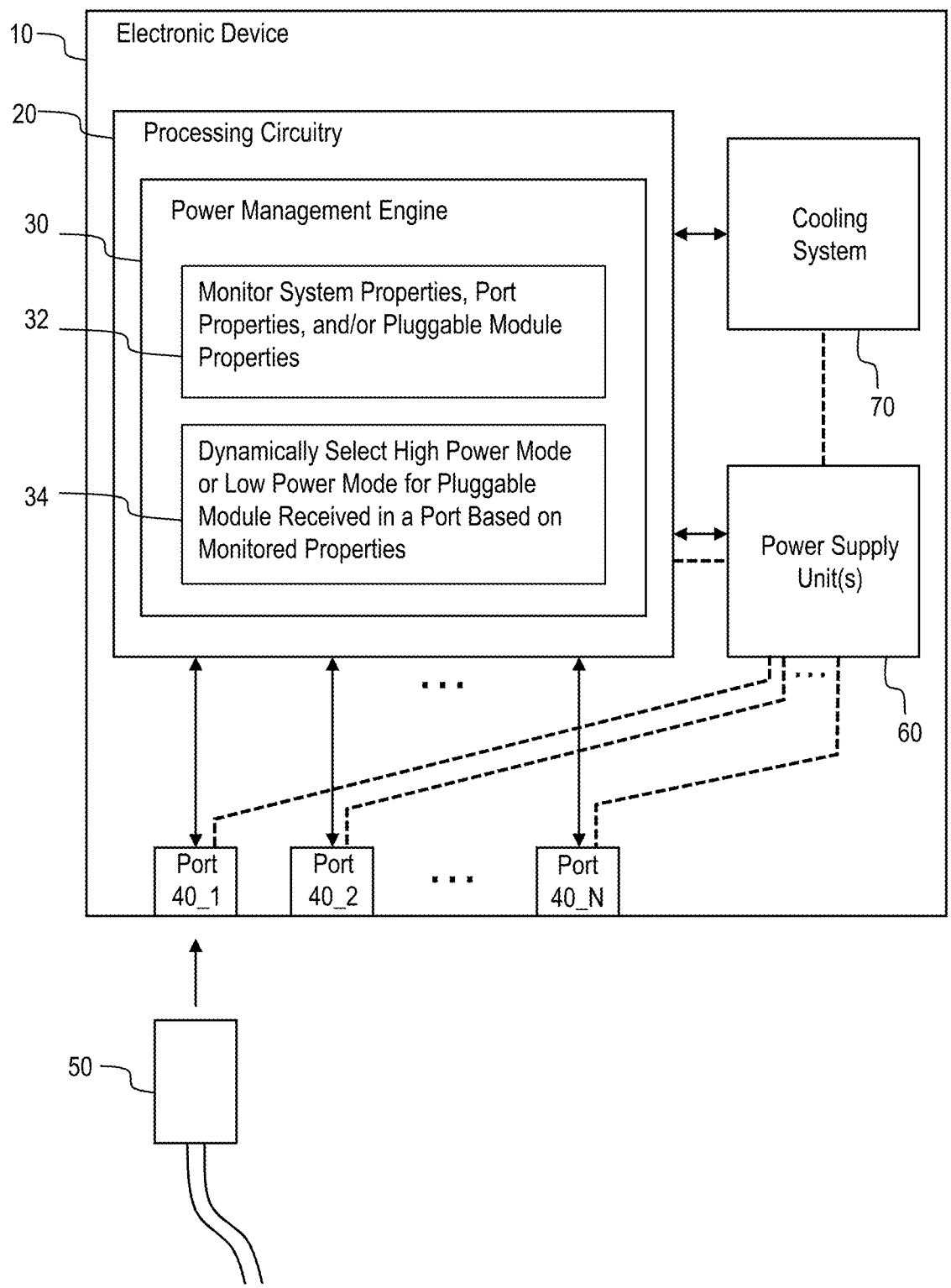
FIG. 1 is a block diagram illustrating an example electronic device.

As noted above, in some systems an electronic device (such as a network switch, for example) is configured to removably receive pluggable auxiliary devices (such as optical transceiver modules, for example) plugged into ports (also referred as bays or slots). The electronic device configured to receive the pluggable auxiliary devices may be referred to herein as a "primary electronic device" to distinguish it from the pluggable auxiliary device. However, it should be understood that "primary" is used in this context merely as a label and this terminology is not intended to otherwise limit the configuration or usage of the electronic device. The pluggable auxiliary device may also be referred to as a "pluggable device," "auxiliary device," or "pluggable module."

Different pluggable modules can consume different amounts of power, even if they are the same general type of module. For example, some pluggable optical transceivers may consume on the order of 80 W of power, whereas a more moderately powered pluggable optical transceiver may consume on the order of 20 W of power per device. Moreover, the same pluggable module may draw different amounts of power in different modes of operation. For example, some pluggable auxiliary devices have a high-power mode and a low-power mode, and in the high-power mode the full functionality of the pluggable module is enabled so that the module can draw up to its maximum rated limit whereas in the low-power mode the performance of the pluggable module is limited and the module may consume less power. For example, a pluggable module that draws 20 W in high-power mode might draw 2 W in low-power mode. In addition to the variability in power draw between different pluggable modules and different modes of operation, different pluggable modules generate different amounts of heat. While the heat generation of the pluggable modules is generally correlated to their power draw, different pluggable modules may have more efficient heat dissipation and thus even if two pluggable modules are of the same power class, they may nevertheless have different thermal characteristics (e.g., one may run hotter than the other).

Each primary electronic device has a limited amount of power and cooling capacity that it can allocate to the pluggable modules, and in many electronic devices these power and cooling capacities are less than would be needed to allow for all of the ports to be simultaneously populated by high-power and/or high-thermal pluggable modules. In other words, in many primary electronic devices, the power and cooling capacities are designed to accommodate a relatively moderate to low per-port power level and thermal demand. Thus, in such electronic devices, it may be possible to populate all of the ports of the system using moderate or low powered pluggable modules, but if high-power or high-thermal pluggable modules are used then it is possible that the power and/or cooling capacities of the system may be exceeded (referred to herein as overloading and overheating, respectively). High-power and/or high-thermal pluggable modules may still be usable in such primary electronic devices, but generally their numbers may need to be limited to less than all of the ports to avoid overloading and/or overheating. For example, if a given electronic device has 200 W of available power and 40 ports, then the device may be capable of having all of its ports populated by pluggable modules that use 5 W or less, or 10 of the ports being populated by pluggable modules that use 20 W (with the remainder of the ports unoccupied), or some mix of lower powered pluggable modules and higher power pluggable modules. On the other hand, if 11 of the ports were populated by 20 W modules, then the total power draw (220 W) would exceed the power capacity (200 W), resulting in an overload condition. An overload condition may cause the electronic device to shut down or otherwise limit the performance thereof. For example, in some cases, when too many high-power pluggable modules are installed a reboot loop may occur. In such a reboot loop, the system may reboot in response to the pluggable modules drawing too much power, then upon rebooting the pluggable modules again draw too much power triggering another reboot, and this may occur again and again in a loop until system power is removed or enough modules are removed to be within the specification of the electronic device.

To avoid overloading or overheating the primary electronic device, a manufacturer may specify limits for the numbers of high-power and/or high-thermal pluggable modules that can be used. These limits may be specified, for example, in a user manual or other similar documentation. But a user may not be aware of or heed these limits, and thus might install too many high-powered or high-thermal pluggable modules, resulting in the system being overload and/or overheated. In some cases, this overloading or overheating might not occur immediately, as the instantaneous power draw of the pluggable modules can be variable and thus the overload/overheating could occur at any time after the module is plugged in. This delay and unpredictability can make it harder for a user to figure out what is causing the problem when one eventually arises. Moreover, even if the user is aware that there are limits, it may be difficult for the user to remember the specific limits (especially if there are many different limits specified for different types or combinations of modules) and it can be inconvenient for the user to have to consult the documentation each time they install a pluggable module to determine what the limits are and if they have been met.

In addition to specifying limits for the numbers of high-power and/or high-thermal pluggable modules, some manufacturers may limit which ports can receive a high-power and/or high-thermal pluggable module. For example, a manufacturer may specify that only the first M ports of the device may have high power or high-thermal pluggable modules installed therein. The manufacturer may specify this in the user manual or other documentation, and/or may include a visual indicator on the ports such as a color code or label. But as with the specified limits on the number of high-power modules, the user might not be aware of or heed the limits on which ports can accommodate the high-powered and/or high-thermal pluggable modules. Moreover, even if the user knows which ports are limited to which type of module, the limitation to using only specific ports can be inconvenient to the user as they may desire to use other ports (e.g., to achieve a desired arrangement for cable management, or to avoid having to reposition already plugged-in modules).

Of course, one way to reduce the risk of overloading and/or overheating the primary device is to provide the device with increased power and cooling capacity. However, increasing the power and cooling capacity of the primary electronic device can be costly and difficult. Moreover, designing the primary electronic devices to accommodate the worst-case-scenario (e.g., all of the ports being populated with high-power and high-thermal pluggable modules) might not always be practical or economical. Furthermore, even an over-built device that can accommodate the worst-case-scenario at the time of manufacture might, over time, become susceptible to being overloaded or overheated as new pluggable modules become available that have higher power and thermal needs.

To address the issues noted above, example electronic devices disclosed herein are configured to dynamically manage the power and/or cooling of pluggable modules installed therein so as to avoid overwhelming the capacities of the system without the user having to worry about limits on the number of pluggable modules or limits on which ports can receive which modules. In particular, the primary electronic device comprises a power management engine that is configured to dynamically set power modes for the pluggable modules installed in the primary electronic device, switching individual pluggable modules between a high-power mode and a low-power mode so as to avoid overwhelming the power capacities and/or the cooling capacities of the system. The settings are dynamic in that they change over time in response to changes in conditions, such as new transceivers being installed and/or changes in monitored system, port, and/or transceiver properties (such as a change in the available power for the primary electronic device).

For example, if a new pluggable module is installed in the system, the power management engine may determine whether the operation of this pluggable module at full power would cause a power overload in view of the current state of the system, and if so, set the pluggable module to operate in the low-power mode to avoid the overload. Conversely, if there is sufficient excess power to allow the new pluggable module to operate at full power, the power management engine may set the new pluggable module in the high-power mode to allow for maximum performance. The power management engine may perform similar determinations for the pluggable modules based on the cooling capacity of the system and the thermal properties of the pluggable modules, for example setting new pluggable modules into low-power mode if the cooling capacities of the system have been reached and setting the new pluggable modules into high-power mode if there is excess cooling capacity remaining. These determinations may be made and updated dynamically, for example at periodic intervals and/or in response to changes in the system, such as the addition or removal of a pluggable module, the turning on of the system, or other changes. In this manner, the power management engine can ensure that the system remains within its power and thermal capacities regardless of the numbers and types of pluggable modules installed therein. In addition, a user may be free to install pluggable modules without needing to consider limits on the number of high-power or high-thermal modules or limits on which ports can receive such modules.

In some examples, the power management engine monitors properties of the electronic device (system properties), properties of the ports (port properties), and/or properties of the pluggable modules installed in the electronic device (module properties), and the determination of whether the pluggable modules should be placed in a high-power mode or a low-power mode may be based on the monitored system properties, port properties, and/or module properties. For example, in some implementations the system properties include a total amount of power that can be allocated to the pluggable modules and the module properties include the maximum power consumable by each pluggable module. In such examples, the power management engine may determine whether a pluggable module can be placed in the high-power mode based on whether its maximum power consumption exceeds the remaining available power of the system.

As another example, in some implementations the power management engine may determine whether a pluggable module can be placed in the high-power mode based on whether the current number of high-thermal pluggable modules exceeds a specified limit for the number of high-thermal pluggable modules. This limit corresponds to one of the aforementioned system properties, and may be a value specified in advance. The power management engine may also identify high-thermal pluggable modules based on information obtained from the pluggable modules, with the high-thermal status being one of the aforementioned module properties. In some examples, the system properties may further include an airflow direction, and there may be multiple different limits for the number of high-thermal modules, one such limit for each airflow direction. For example, in some implementations the pluggable modules are located at a rear of the electronic device, and in such a device if the airflow were to flow from the front of the device to the rear, then the air reaching the pluggable modules will be preheated by the devices at the front of the electronic device and thus the air may cool relatively less efficiently than it otherwise would if not preheated. Conversely, if the air flows from the rear of the device to the front, then the air reaching the pluggable modules will not be preheated and will cool relatively more efficiently. Thus, depending on the direction of airflow, the system may be capable of cooling different numbers of high-thermal modules, and accordingly different limits may be set for each airflow direction. In such examples, the power management engine may determine whether a pluggable module can be placed in the high-power mode based on the identified airflow direction and whether the current number of high-thermal pluggable modules exceeds the maximum number of high-thermal pluggable modules specified for the airflow direction.

As another example, in some implementations the power management engine may determine whether each pluggable module can be placed in the high-power mode based on whether the current temperatures of the pluggable modules exceed per-port maximum temperatures associated with the ports in which they are respectively installed. The per-port maximum temperature and the module properties may include the current temperature of each pluggable module. In such examples, the power management engine may determine whether a pluggable module can be placed in the high-power mode based on whether its current temperature exceeds the maximum temperature of the port in which the module is installed.

As another example, in some implementations the power management engine may allow users to schedule downtime for ports to save power at times when full capabilities are not needed. In such examples, the power management engine determine whether each pluggable module can be placed in the high-power mode based on whether the port in which the module is installed is scheduled for downtime.

These and other examples will be described in greater detail below in relation to FIGS. 1-6.

FIG. 1 illustrates an example electronic device 10. The electronic device 10 comprises a number of ports 40 configured to removably receive pluggable modules 50 installed therein. The electronic device 10 also comprises processing circuitry 20, one or more power supply units 60, and a cooling system 70. The electronic device 10 is an example of a primary electronic device as defined above. The electronic device 10 may be, for example, a network device (e.g., a switch), a computing device (e.g., server), or any other electronic device that comprises processing circuitry and ports as described herein. The pluggable modules 50 may be, for example, optical transceivers (e.g., QSFP connectors, OSFP connectors, etc.), PCIe cards, SSDs such as NVMe or M.2 SSDs, or other similar devices.

Each port 40 may comprise a receptacle (e.g., bay) configured to removably receive the pluggable module 50 installed therein. For example, the electronic device 10 may comprise a chassis or housing (not illustrated) and the receptacles of the ports 40 may comprise openings in the chassis or housing. Each port 40 may also comprises electrical, optical, and/or other connectors configured to communicably connect with complementary connectors of the pluggable module 50 when the pluggable module 50 is installed in the port 40. The connectors of a port 40 may include power connections to supply electrical power to a pluggable module 50 when the pluggable module 50 is installed in the port 40. The ports 40 are fed power from the power supply unit(s) 60, as indicated by the dashed lines in FIG. 1. The connectors of a port 40 may also include communications connections to convey data between a pluggable module 50 is in the port 40 and another portion of the electronic device 10 (e.g., another port 40, the processing circuitry 10, etc.). FIG. 1 illustrates there being N ports 40_1, 40_2, . . . 40_N, but any number of ports 40 may be included in the electronic device 10.

The electronic device 10 may also comprise additional ports (not illustrated) for connecting to communications paths other than the pluggable modules 50, such as RJ45 ports for connecting to Ethernet cables. Such other communications ports may be communicably connectable to the ports 40 (e.g., via processing circuitry 10) to allow communication between the pluggable modules 50 and other device coupled to the other communications ports. For example, in some implementations the electronic device 10 is a network switch, ports 40 are used with optical transceivers to enable high-speed optical connections to devices capable of such optical communication (e.g., inter-switch communications between two top-of-rack switches) and the additional other ports may also used for non-optical communications (e.g., Ethernet) to other devices coupled to the switch (e.g., compute nodes).

The power supply unit(s) 60 are configured to supply electrical power to the various components of the electronic device 10, such as the ports 40, the processing circuitry 20, and the cooling system 70. The power supply units 60 may comprise, for example, power converters configured to receive an input electrical power from outside the electronic device 10 (e.g., AC mains power, high-voltage DC power, etc.) and convert the input power into a form (or forms) suitable for the various components. For example, the power supply units 60 may convert AC power to DC power and/or change a voltage of DC power to one or more power signals suitable for the various components of the electronic device. In some examples, the power supply units are configured to be able to provide up to specified amount of power to the computing system 10, referred to herein as the overall power capacity of the system. A portion of the overall power capacity is reserved for the processing circuitry 20, cooling system 70, and other components of the electronic device 10. A remainder of the power capacity that is not reserved for the rest of the electronic device 10 is available for allocation to the ports 40, and this amount is referred to herein as the System Available Power (SysPwr). Not only is there a limit to the total amount of power allocatable to the ports 40, in some examples each port 40 may have a corresponding limit to the power it can individual receive, which is referred to herein as a per-port maximum power (PortMaxPwr_n). As used herein, n is an index identifying a particular port 40 or module 50, so that, for example, PortMaxPwr_1 refers to the per-port maximum power of the port 40_1, PortMaxPwr_2 refers to the per-port maximum power of the port 40_2, and so on. In addition, each port 40 may have a per-port reserve power amount (ResPwr_n) which corresponds to an amount of power reserved for the port 40, separate and apart from the amount that usable by the pluggable module 50 installed therein. Thus, for example, if a pluggable module 50_2 plugged into port 40_2 can use up to 20 W of power and ResPwr_2 of the port 40_2 is 1 W, then the amount of power that should be allocated to the port 40_2 to accommodate these needs would be 21 W.

The cooling system 70 may comprise one or more cooling devices configured to aid in removal and dissipation of heat from the electronic device 10. For example, the cooling system 70 may comprise air cooling infrastructure, such as fans to cause airflows through the electronic device 10, heat sinks in contact with heat generating components, thermal transfer devices (e.g., heat pipes) to transfer heat between components, etc. As another example, the cooling system 70 may comprise liquid cooling infrastructure, such as liquid supply and return lines, cold plates, fluid couplings, etc. In some examples, the cooling system 70 cools not only the processing circuitry 20 and other aspect so the electronic device 10, but also the pluggable modules 50 plugged into the ports 40. For example, in the case of air cooling, at least some of the airflows generated by the cooling system 70 may flow through or over the ports 40. As another example, in the case of liquid cooling, cold plates and/or thermal transfer devices may be provided for some or all of the ports 40 to thermally coupled the pluggable modules 50 to liquid coolant lines. Because the cooling system 70 can only remove a certain amount of heat per unit time from the computing system 10, and because some of that capability may need to be reserved for cooling the processing circuitry 20 or other components, in some examples the cooling that is available for the pluggable modules 50 may be limited. Thus, to avoid overwhelming the cooling capacities of the system, in some examples, each port 40 may have a per-port maximum temperature (PortMaxTemp) assigned thereto (this may be stored, for example, in storage media of the processing circuitry 20).

The processing circuitry 20 comprises (e.g., is configured to instantiate) a power management engine 30. The processing circuitry 20 comprises a processor configured to execute computer program instructions, dedicated hardware configured to perform specific operations, or some combination of these. A processor may be or comprise, for example, a microprocessor, a Central Processing Unit (CPU), a System-On-Chip (SoC), a Graphical Processing Unit (GPU), a Digital Signal Processor (DSP), or any other type of processor capable of executing computer program instructions. Dedicated hardware may be or comprise, for example, an Application-Specific Integrated Circuit (ASIC), Field Programmable Gate Array (FPGA), Complex Programmable Logic Device (CPLD), an accelerator, discrete logic devices, or other hardware. The processing circuitry 20 may also comprise one or more storage media (e.g., non-transitory machine readable media) storing variables, parameters, or other information used by the processing circuitry 20. In those examples in which the processing circuitry 20 comprises a processor, the storage media may also store instructions that are executable by the processor to cause the processor to perform operations described herein (e.g., operations 32 and 34 described below) and thereby instantiate all or part of the power management engine 30. The processing circuitry 20 may also comprise switching logic that can switchable connect the ports 40 to one another to allow communications between the ports 40 (or, more specifically, between devices connected to the ports 40).

As noted above, the processing circuitry 20 comprises (e.g., is configured to instantiate) the power management engine 30. The power management engine 30 is configured to perform operations 32 and 34, which are described in greater detail below.

Operations 32 comprise monitoring system properties, port properties, and/or pluggable modules properties. These properties may include fixed parameters stored in the processing circuitry 20 (e.g., System Available Power (SysPwr) described above), variables that change based on current conditions (e.g., a total amount of power currently allocated to ports 40 (AllctdPwr)), and measurable properties or states (e.g., a current temperature of a component). The system properties comprise properties that relate to the electronic device 10 as a whole or components thereof, other than properties that are specific to the ports 40. For example, the system properties may include the System Available Power (SysPwr), amount of power currently allocated to ports 40 AllctdPwr, thermal properties of the system (e.g., airflow direction, maximum number of high-thermal modules 50, etc.), or other system properties. Additional system properties are described in greater detail below with respect to various examples. The port properties comprise any property that is specific to the ports 40, such as the per-port maximum temperature (PortMaxTemp), per-port max power (PortMaxPwr_n), a current temperature of the port, and per-port reserved power ResPwr_n mentioned above. Additional port properties are described in greater detail below with respect to various examples. The pluggable module properties comprise any property that is specific to the pluggable module 50, such as the per-module maximum power, per-module thermal properties (e.g., an designation of whether the module is a high-thermal module), a per-module maximum temperature, a current temperature of a pluggable module 50, or other properties. Additional pluggable module properties are described in greater detail below with respect to various examples.

The monitoring of operations 32 does not necessarily imply repeated and ongoing monitoring. Instead, monitoring merely refers to becoming aware of the monitored properties, and this could be performed once or on a repeated basis. In some cases, some properties are monitored just once or occasionally, while other properties are monitored more continually. For example, properties that generally do not change (such as SysPwr) may be monitored just one or infrequently, such as by the power management engine 30 reading a value stored for the property from a storage medium. Other properties that may change more often over time (such as a temperature of a pluggable module) may be monitored repeatedly, such as continually, at periodic intervals, and/or in response to events (e.g., a new pluggable module 50 being installed, the device 10 being powered on, or other events).

In operation 34, the power management engine 30 dynamically selects a high-power mode or a low-power mode for each of the pluggable modules 50 that are installed in the ports 40, based on the monitored properties. For example, the power management engine 30 uses system properties, port properties, pluggable module properties, or some combination thereof to estimate whether placing a pluggable module 50 in the high power mode would overload the power capacities and/or overwhelm the thermal capacities of the device 10, and then the pluggable module 50 may be placed in the high power mode or low power mode accordingly. For example, if a new pluggable module 50 is installed in the device 10, the power management engine 30 may determine whether the current amount of power that is available for allocation to modules 50 (a system property) exceeds an amount of power expected to be consumed by the pluggable module 50 (a pluggable module property), if so then set the pluggable module to operate in the high-power, and if not then set the pluggable module to operate in the high-power mode. As another example, if a new pluggable module 50 is installed in the device 10, the power management engine 30 may determine whether the pluggable module 50 is a high-thermal module (a pluggable module property), and if so determine whether the device 10 can have another high-thermal module based on a specified maximum number of high-thermal pluggable modules (a system property). As another example, the power management engine 30 may determine whether a current temperature of a pluggable module 50 (a pluggable module property) is exceeds a per-port max temperature (a port property) of the port 40 in which the module 50 is installed, and if so set the pluggable module to a low-power mode.

The operations 34 may be performed in response to an event, such as a new pluggable module 50 being plugged into a port 40 or the device 10 being powered on or rebooted. The operations 34 may also, or alternatively, be performed at predetermined timings (e.g., periodically or at scheduled times).

In some examples, the operations 34 may be performed for each of the pluggable modules 50 that are installed in the ports 40. In some examples, the ports 40 may have a predetermined ordering, and the operations 34 may be performed for the pluggable modules 50 based on the ordering of the ports 40. This may allow for a prioritization of ports 40 and the modules 50 plugged therein. For example, if the ordering is port 40_1 first, port 40_2 second, and so on to port 40_N, then that means the pluggable modules 50 installed in lower-numbered ports (e.g., port 40_1) will have operations 34 performed for them first. When there are multiple modules 50 installed, the modules 50 that have the operations 34 performed sooner will have a greater chance of being placed in high-power mode than those for which the operations 34 are performed later in the event that there is insufficient power or cooling capacity to place all the pluggable module 50 in high-power mode. In this manner, a user may still have some indirect control over which modules 50 are placed in high-power mode by placing them in higher priority ports 40. However, the user is not required to use the higher priority ports 40 for higher powered pluggable modules 50—they user is free to plug the higher powered modules 50 in other ports 40 and they will run in high-power mode if there is sufficient power and thermal headroom.

Turning now to FIGS. 2-6, methods 200 to 600 will be described. These methods 200 to 600 correspond to specific examples of the operations 32 and 34 already described above. Thus, in some examples the power management engine 30 is configured to perform method 200, in some examples the power management engine 30 is configured to perform method 300, in some examples the power management engine 30 is configured to perform method 400, in some examples the power management engine 30 is configured to perform method 500, in some examples the power management engine 30 is configured to perform method 600, and in some examples the power management engine 30 is configured to perform a combination of two or more of the methods 200 to 600 (any combination, including all). In some examples, the processing circuitry 20 may comprise computer program instructions stored on storage media corresponding to the various operations of the methods 200, 300, 400, 500, and/or 600.

In the description of FIGS. 2-6, the pluggable modules 50 are referred to as transceivers 50, but it should be understood that transceivers 50 are just one example of the pluggable modules 50 and the same methods are applicable to any type of pluggable module 50.

Figure 2:
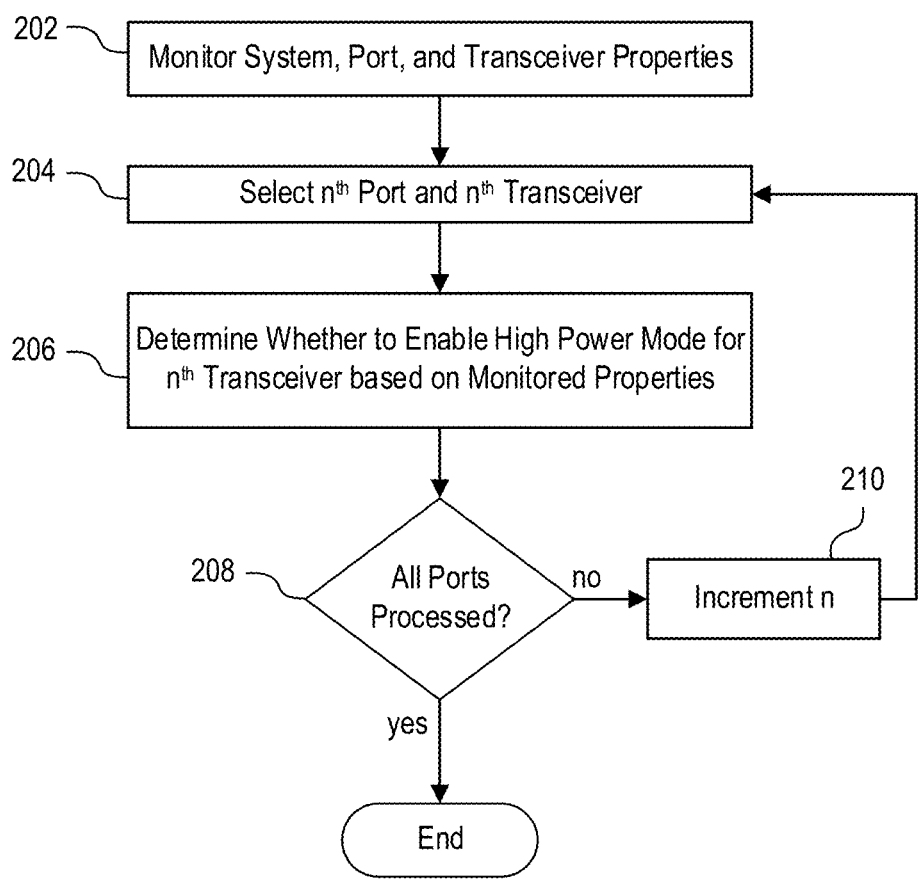
FIG. 2 is a process flow diagram illustrating a first example method.

FIG. 2 illustrates the method 200. The method 200 begins at block 202, which comprises monitoring system, port, and transceiver properties. The method 200 then enters a loop comprising blocks 204 to 210, which is performed iteratively for each port 40 into which a transceiver has been installed.

Block 204 comprises selecting an $n^{th}$ port 40 and $n^{th}$ transceiver 50 for processing (the $n^{th}$ transceiver 50 being the transceiver 50 plugged into the $n^{th}$ port 40). In an initial iteration of the loop, n may be equal to an initial value (e.g., n=1). Thus, in the initial iteration, the port 40_1 and the transceiver 50_1 installed therein are selected for processing. In subsequent iterations of the loop, the value of n may change and thus a different port 40 and transceiver 50 are selected in block 204 with each iteration. Although not shown in FIG. 2, if the $n^{th}$ port 40 does not have a transceiver 50 installed therein, then that port 40 may be skipped in block 204 and n may be incremented to consider to select the next port 40 (if any)

In block 206, the power management engine 30 determines whether to enable high-power mode for the $n^{th}$ transceiver 50 selected in block 204. This determination is made based on the properties monitored in block 202. For example, the determinations described above in relation to operations 34 may be performed in block 206. As another example, methods 300, 400, 500, and 600 comprise specific examples of how the determination of block 204 may be made. If it is determined that a transceiver should be placed in high-power mode, the power management engine 30 may send instructions to the transceiver 50 to enter the high power mode. If it is determined that a transceiver should be placed in low-power mode, the power management engine 30 may send instructions to the transceiver 50 to enter the low power mode.

In block 208 it is determined if all of the ports 40 have been processed. If no, then in block 210 n is incremented and the method loops back to 204 for another iteration. If so, then the process ends.

Figure 3:
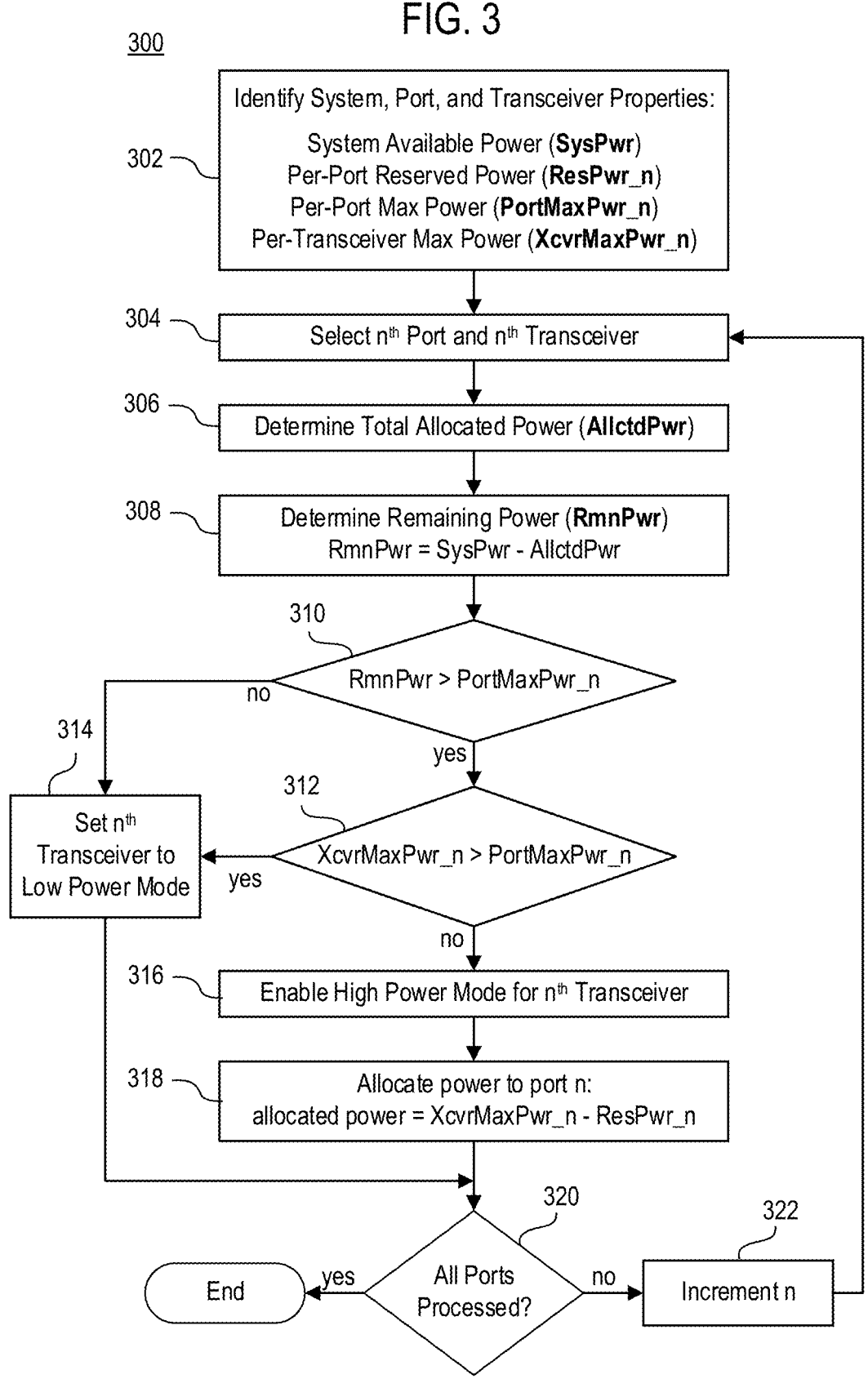
FIG. 3 is a process flow diagram illustrating a second example method.

FIG. 3 illustrates a method 300. As noted above, the method 300 may be performed by the power management engine 30 as part of the operations 32 and 34. Moreover, the method 300 may be a specific example of the method 200, with block 302 of method 300 being an example of block 202 of method 200, and blocks 306-318 of the method 300 being an example of block 206 of the method 200.

Block 302 comprises identifying system, port, and transceiver properties, In this example, the system properties comprise the system available power (SysPwr); the port properties comprise the per-port reserved power (ResPwr_n) for each port 40 and the per-port max power (PortMaxPwr_n) for each port 40; and the transceiver properties comprise the per-transceiver max power (XcvrMaxPwr_n) for each transceiver 50 installed in the device 10.

In block 304, the $n^{th}$ port 40 and transceiver 50 are selected, as in block 202.

In block 306, the total allocated power (AllctdPwr) is determined. AllctdPwr comprises the sum total of all power that has been allocated to ports 40 thus far in the process. So, for example, in the first iteration AllctdPwr will equal zero because no ports 40 have yet had power allocated thereto, in a second iteration AllctdPwr will equal whatever amount of power was allocated to the first port 40_1 as part of the first iteration, during a third iteration, AllctdPwr will equal the sum of power allocated to the first and second ports 40_1 and 40_2 in the first and second iterations, and so on. AllctdPwr is another example of a system property.

In block 308, the remaining power that is available for allocation to ports (RmnPwr) is determined. RmnPwr is equal to SysPwr minus AllctdPwr. RmnPwr is another example of a system property.

In block 310, it is determined whether RmnPwr is greater than (or in some cases, greater-than-or-equal-to) the per-port max power (PortMaxPwr_n) for the $n^{th}$ port. Alternatively, it is equivalent to determine whether PortMaxPwr_n is equals to or less than RmnPwr. If RmnPwr exceeds PortMaxPwr_n (YES branch), the process continues to block 312. If RmnPwr does not exceed PortMaxPwr_n (NO branch), the process continues to block 314.

In block 312, another determination is made, this time whether the property XcvrMaxPwr_n for the $n^{th}$ transceiver 50_$n$ exceeds PortMaxPwr_n for the $n^{th}$ port 40_$n$. If yes, then the process continues to block 314. If no, then the process continues to block 316.

In block 314, the $n^{th}$ transceiver 50_$n$ is set to lower power mode. Note that block 314 is reached when the result of the determination of block 310 is negative or when the determination of block 312 is positive. Thus, the $n^{th}$ transceiver 50_$n$ is set in the low power mode if either of the following conditions is true: (a) RmnPwr does not exceed PortMaxPwr_n (block 310) or (b) XcvrMaxPwr_n exceeds PortMaxPwr_n (block 312). These conditions being satisfied implies that there is a risk that, if operated at full power, the transceiver 50 will draw more power than the port 40 can handle (PorMaxPwr_n) and/or more power than is available for allocation (RmnPwr), and accordingly it may be needed to place the transceiver 50 in the low power mode may help to avoid overloading the device 10.

In block 316, high-power mode is enabled for the $n^{th}$ transceiver 50_$n$. Note that block 316 is reached when the result of the determination of block 310 is positive and when the determination of block 312 is negative. Thus, the $n^{th}$ transceiver 50_$n$ is set in the higher power mode only if both of the following conditions is true: (a) RmnPwr exceeds (or in some cases, is equal to) PortMaxPwr_n (block 310) and (b) XcvrMaxPwr_n does not exceed PortMaxPwr_n (block 312). These conditions being satisfied implies that, even if the transceiver 50 is operated at full power, the transceiver 50 will not draw more power than the port 40 can handle (PorMaxPwr_n) or more power than is available for allocation (RmnPwr), and accordingly it is safe to place the transceiver 50 in the high power mode.

In block 318, power is allocated to the $n^{th}$ port 40_$n$. Specifically, the amount of allocated power is equal to XcvrMaxPwr_n minus ResPwr_n. That is, the $n^{th}$ port 40_$n$ is allocated an amount of power that will bring the total allocation to the $n^{th}$ port 40_$n$ up to the $n^{th}$ transceiver's maximum power XcvrMaxPwr_n. Because the $n^{th}$ port 40_$n$ will have already been allocated the reserve power ResPwr_n, the amount of additional power that needs to be allocated to bring the total allocation up to XcvrMaxPwr_n is: XcvrMaxPwr_n−ResPwr_n.

In block 320 it is determine if all ports have been processed. If so, the process ends. If not, the process proceeds to block 322 where n is incremented and then the loop 304-320 is performed again.

Figure 4:
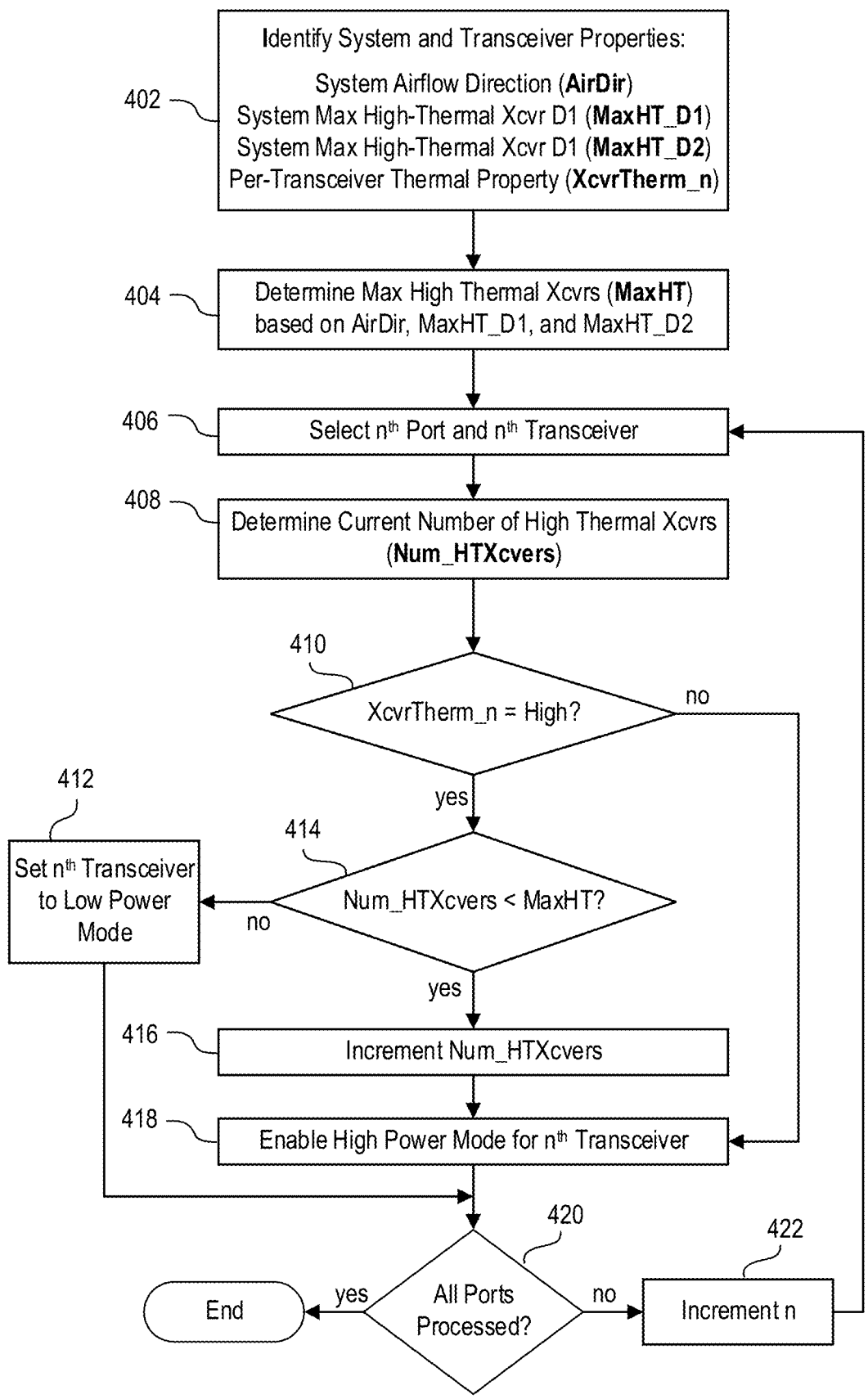
FIG. 4 is a process flow diagram illustrating a third example method.

FIG. 4 illustrates a method 400. As noted above, the method 400 may be performed by the power management engine 30 as part of the operations 32 and 34. Moreover, the method 400 may be a specific example of the method 200, with block 402 of method 400 being an example of block 202 of method 200, and blocks 404-418 of the method 400 being an example of block 206 of the method 200.

Block 402 comprises identifying system and transceiver properties. In this example, the system properties comprise the system airflow direction (AirDir), a system max high-thermal transceivers for first airflow direction (MaxHT_D1), and a system max high-thermal transceivers for second airflow direction (MaxHT_D2); and the transceiver properties may comprise per-transceiver thermal properties (XcvrTherm_n). The system airflow direction AirDir indicates a direction that the air flows through the device 10, with there being at least two directions possible for AirDir. For example, in some devices air can flow front-to-back or back-to-front. The direction of airflow may be established at the time of manufacture, for example by direction fans are oriented. In other examples, the direction of airflow may be established at the time of installation—for example, a data center may have a hot isle and a cold isle and the device 10 may be configured in the field to have an airflow direction that matches the data center configuration. In some examples, the property AirDir may be stored in a storage medium when the airflow direction is fixed (e.g., at manufacture). The different airflow directions may provide different amounts of cooling to the transceivers 50. For example, if the transceivers are at the rear of the device 10 and the air flows front-to-back, the air is preheated before it reaches the transceivers 50 and thus is less efficient at cooling the transceivers 50, while if the air flows back-to-front the air is cooler when it reaches the transceivers 50 and thus can cool the transceivers 50 more efficiently. Accordingly, the maximum number of high-thermal transceivers that the device 10 can accommodate may vary depending on the airflow direction, and thus properties MaxHT_D1 and MaxHT_D2 may be different. MaxHT_D1 and MaxHT_D2 may be programmed into the storage medium for each of the airflow directions, for example at manufacture. The transceiver property of XcvrTherm_n indicates whether the transceiver is a high thermal transceiver. A high-thermal transceiver may be a transceiver whose thermal output exceeds a predetermine threshold. In some examples, the transceivers 50 may be programed, for example by their manufacturer, with a binary value that indicates whether they are high-thermal or not, and this value may correspond to the XcvrTherm_n property. In other examples, the transceivers 50 may be programed with a value that quantitatively indicates their thermal output (e.g., a number of Watts) and the device 10 may compare this value to a threshold to determine whether the transceiver is high-thermal.

In block 404, the maximum number of high-thermal transceivers (MaxHT) for the electronic device 10 is determined based on the AirDir, MaxHT_D1, and MaxHT_D2. That is, if the airflow direction AirDir is D1, then the parameter MaxHT is set equal to MaxHT_D1, whereas if AirDir is D2 then the parameter MaxHT is set equal to MaxHT_D2.

In block 406, the $n^{th}$ port 40 and transceiver 50 are selected, as in block 202.

In block 408, the current number of high-thermal transceivers 50 (Num_HTXcvers) is determined. For the first iteration, Num_HTXcvers is zero, whereas upon subsequent iterations Num_HTXcvers may increase as high-thermal transceivers 50 are processed.

In block 410 it is determined if the current transceiver 50_$n$ being processed is a high-thermal transceiver, i.e., if XcvrTherm_n=High. If not, then then the process continues to block 418. If so, then the process continues to block 414.

In block 414 it is determined if the number of high-thermal transceivers Num_HTXcvers is less than the maximum number MaxHT previously determined. If not, then that means no additional high thermal transceivers can be accommodated and therefore the process continues to block 412. In block 412, the $n^{th}$ transceiver 50_$n$ is set to the low power mode. If block 414 is answered YES, then an additional high-thermal transceiver can be accommodated and therefore the process continues to block 416. In block 416, the number of high-thermal transceivers is incremented, and then in block 418 the high power mode is enabled for the $n^{th}$ transceiver 50_$n$.

In block 420 it is determined if all ports 40 have been processed. If so, the process ends. If not, then the process continues to block 422 where n is incremented, and then the loop 406 $t$-418 is performed again for the next port 40.

Figure 5:
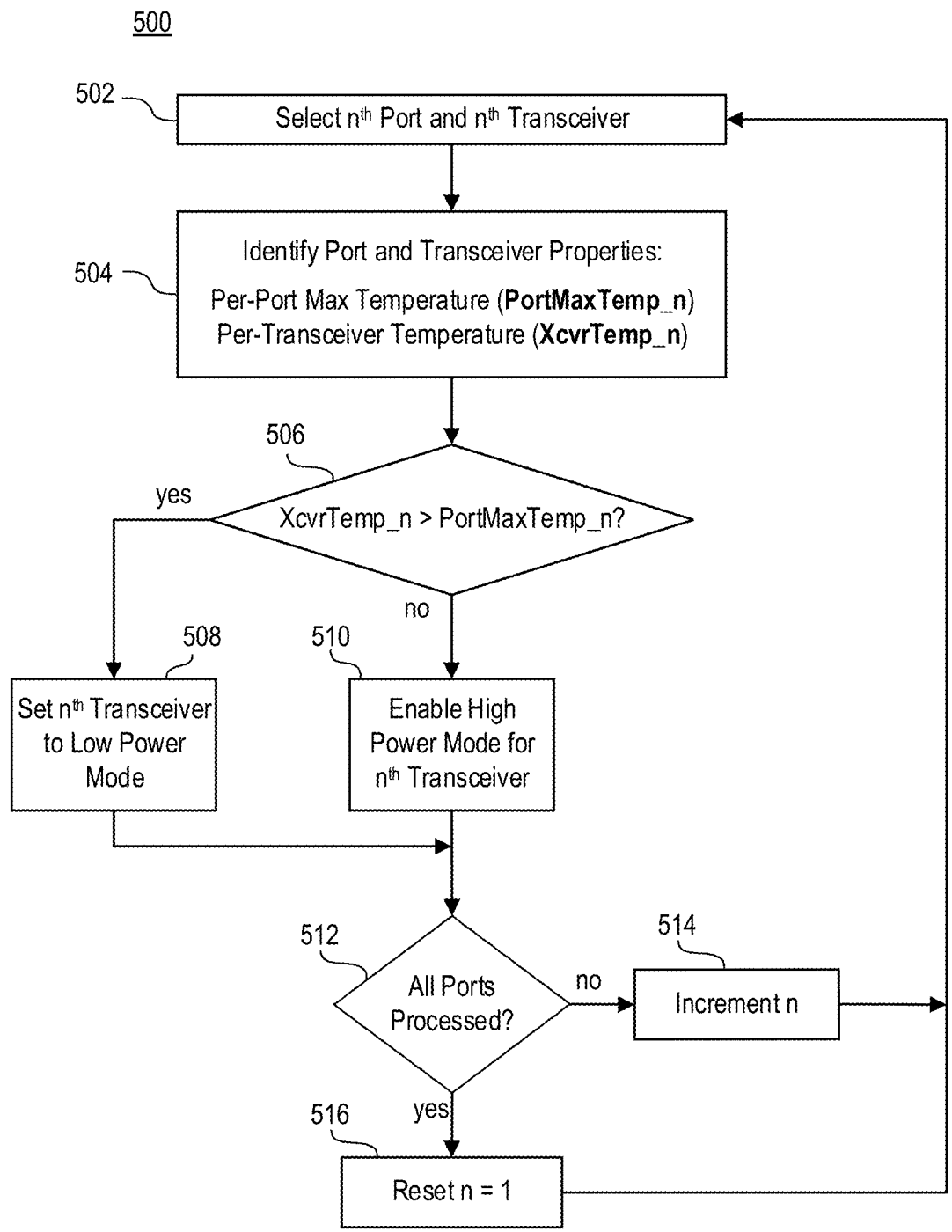
FIG. 5 is a process flow diagram illustrating a fourth example method.

FIG. 5 illustrates a method 500. As noted above, the method 500 may be performed by the power management engine 30 as part of the operations 32 and 34. Moreover, the method 500 may be a specific example of the method 200, with block 504 of method 500 being an example of block 202 of method 200, and blocks 506-510 of the method 500 being an example of block 206 of the method 200.

In block 502, the $n^{th}$ port 40 and transceiver 50 are selected, as in block 202.

In block 504, port and transceiver properties are identified. In particular, in this example, the port properties comprise a per-port maximum temperature (PortMaxTemp_n), and the transceiver properties comprise a per transceiver current temperature (XcvrTemp_n). XcvrTemp_n may be read from the transceivers, which may monitor their own temperatures. Alternatively, a temperature sensor may be disposed within each port 40 to monitor the temperatures of the transceivers 50.

In block 506, it is determined if XcvrTemp_n exceeds PortMaxTemp_n. If so, the transceiver is too hot and therefor the process continues to block 508 wherein the transceiver is set to the low power mode. This will help to cool the transceiver down. While some transceivers are configured to monitor their own temperature and to take actions (e.g., shut down) if the temperature exceeds a threshold, not all transceivers have this ability and thus block 506 may help to prevent thermal overload of such transceivers 50. Moreover, even with transceivers 50 that are able to take corrective actions on their own when they get too hot, the threshold used by the transceiver to make this determination may exceed the PortMaxTemp_n, and thus if thermal control is left entirely to the transceivers it is possible that ports 40 may exceed their thermal ratings for some time before the transceiver 50 shuts down, which could result in damage to the system. Thus, blocks 506 and 508 may help to ensure such overheating does not occur.

If XcvrTemp_n does not exceed PortMaxTemp_n, then the transceiver 50 is not too hot and therefore the process continues to block 510, wherein high power mode is enabled for the transceiver 50. If the transceiver is already operating in high-power mode, this enabling allows the transceiver to continue operating in high-power mode. If the transceiver 50 was previously set to low power mode due to having previously been determined to be over temperature in blocks 506 and 608, then block 510 allows the transceiver 50 to return to high power mode after it has sufficiently cooled off. In some examples, after turning a transceiver 50 to low power mode for being overtempt, a hysteresis value may be added to XcvrTemp_n in subsequent performances of method 500 (e.g., until the transceiver is returned to high-power mode) to avoid too frequent of cycling between high and low power modes. Alternatively, after turning a transceiver 50 to low power mode for being overtempt, the transceiver 50 may be excluded from further performances of the method 500 until a predetermined period of time has passed to avoid the frequent cycling between high and low power modes.

In block 512 it is determined if all ports 40 have been processed. If not, then the process continues to block 512 where n is incremented, and then the loop 502-512 is performed again for the next port 40. If all ports have been processed, the process continues to block 516 wherein n is reset to its initial value (e.g., 1) and the process is performed again. In other words, method 500 may be repeated continually (e.g., until interrupted by a command or event), thus allowing for constant temperature monitoring. A predetermined delay may be implemented between blocks 516 and 502 to cause the method 500 to be performed at predetermined intervals (e.g., to reduce processing overhead).

FIG. 6 illustrates a method 600. As noted above, the method 600 may be performed by the power management engine 30 as part of the operations 32 and 34. Moreover, the method 600 may be a specific example of the method 200, with block 604 of method 600 being an example of block 202 of method 200, and blocks 606-614 of the method 600 being an example of block 206 of the method 200.

In block 602, the $n^{th}$ port 40 and transceiver 50 are selected, as in block 202.

In block 604, a power saving configuration of an $n^{th}$ port 40 is identified. The power saving configuration comprises information indicating whether the port 40 can be scheduled for downtime, and if so information indicating a schedule for such scheduled downtime. For example, downtime may be scheduled at times when it is expected that the port 40 will not be needed or will only be used lightly. This power saving configuration is an example of a transceiver property. The power saving configuration may be stored in the transceiver and/or in storage media of the electronic device. In some examples, the power saving configuration may be user configurable.

In block 606, it is determined, based on the power saving configuration, whether the $n^{th}$ port 40_n is currently scheduled for downtime. If so, then the process continues to block 608. If not then the process continues to block 610, wherein high-power mode is enabled for the $n^{th}$ transceiver 50_n (and if the transceiver was previously turned off, then the transceiver 50_n is turned back on).

In block 608, it is determined if the $n^{th}$ transceiver 50 is being used. In some examples, this determination may comprise determining whether any traffic is flowing through the $n^{th}$ transceiver 50. In other examples, this determination may comprise determining whether traffic above a certain threshold level is flowing through the $n^{th}$ transceiver 50. In some examples, the determination may be made as to current levels of traffic. In some examples, the determination may be made as to historic levels of traffic (e.g., an average level of traffic over a period of time). If it is determined that the $n^{th}$ transceiver 50_n is being used, then the process continues to block 614 and the transceiver 50_n is set to low power mode. If it determined that the $n^{th}$ transceiver 50_n is not being used, then the process continues to block 612 and the transceiver 50_n is turned off.

In block 616, it is determined if all ports have been processed. If not, then the process continues to block 618 and n is incremented by 1. If so, then the process continues to block 620 and n is reset. In both cases, the process then loops back for another iteration of blocks 602-616. A predetermined delay may be implemented between blocks 620 and 602 to cause the method 600 to be performed at predetermined intervals.

In the methods 200, 300, 400, 500, and 600 described above, various operations are described in terms of iterative loops performed in sequence for each of the ports 40. It should be understood that this interactions could instead be performed simultaneously.

In addition, in the methods 200, 300, 400, 500, and 600 described above, enablement of the high-power mode is referred to. In some examples in which the power management engine 30 is configured to perform multiple of the methods 200-600, the high-power mode being enabled according to one of the methods does not necessarily mean that high power mode is turned on. Generally, the high-power mode is turned on for a transceiver 50 only the transceiver has not been set to the low power mode by any of the applicable methods. If any of the applicable methods sets a given transceiver to low power mode, this assignment to low power mode takes precedence over any other one of the methods enabling high power mode. For example, if a transceiver 50 has high power mode enabled under the method 300 because there is sufficient power capacity but then the same transceiver is set to low power mode under the method 400 because there are too many high thermal devices, the low power mode setting of the method 400 takes precedence and the transceiver 50 will be set to low power mode.

In some examples, methods 300 and 400 may be performed in response to a new transceiver 50 being plugged into a port 40 or in response to the electronic device 10 being turned on, while methods 500 and 600 are performed periodically or continuously.

In the description above, various types of electronic circuitry are described. As used herein, "electronic" is intended to be understood broadly to include all types of circuitry utilizing electricity, including digital and analog circuitry, direct current (DC) and alternating current (AC) circuitry, and circuitry for converting electricity into another form of energy and circuitry for using electricity to perform other functions. In other words, as used herein there is no distinction between "electronic" circuitry and "electrical" circuitry.

It is to be understood that both the general description and the detailed description provide examples that are explanatory in nature and are intended to provide an understanding of the present disclosure without limiting the scope of the present disclosure. Various mechanical, compositional, structural, electronic, and operational changes may be made without departing from the scope of this description and the claims. In some instances, well-known circuits, structures, and techniques have not been shown or described in detail in order not to obscure the examples. Like numbers in two or more figures represent the same or similar elements.

In addition, the singular forms "a", "an", and "the" are intended to include the plural forms as well, unless the context indicates otherwise. Moreover, the terms "comprises", "comprising", "includes", and the like specify the presence of stated features, steps, operations, elements, and/or components but do not preclude the presence or addition of one or more other features, steps, operations, elements, components, and/or groups. Components described as coupled may be electronically or mechanically directly coupled, or they may be indirectly coupled via one or more intermediate components, unless specifically noted otherwise. Mathematical and geometric terms are not necessarily intended to be used in accordance with their strict definitions unless the context of the description indicates otherwise, because a person having ordinary skill in the art would understand that, for example, a substantially similar element that functions in a substantially similar way could easily fall within the scope of a descriptive term even though the term also has a strict definition.

And/or: Occasionally the phrase "and/or" is used herein in conjunction with a list of items. This phrase means that any combination of items in the list—from a single item to all of the items and any permutation in between—may be included. Thus, for example, "A, B, and/or C" means "one of {A}, {B}, {C}, {A, B}, {A, C}, {C, B}, and {A, C, B}".

Elements and their associated aspects that are described in detail with reference to one example may, whenever practical, be included in other examples in which they are not specifically shown or described. For example, if an element is described in detail with reference to one example and is not described with reference to a second example, the element may nevertheless be claimed as included in the second example.

Unless otherwise noted herein or implied by the context, when terms of approximation such as "substantially," "approximately," "about," "around," "roughly," and the like, are used, this should be understood as meaning that mathematical exactitude is not required and that instead a range of variation is being referred to that includes but is not strictly limited to the stated value, property, or relationship. In particular, in addition to any ranges explicitly stated herein (if any), the range of variation implied by the usage of such a term of approximation includes at least any inconsequential variations and also those variations that are typical in the relevant art for the type of item in question due to manufacturing or other tolerances. In any case, the range of variation may include at least values that are within ±1% of the stated value, property, or relationship unless indicated otherwise.

Further modifications and alternative examples will be apparent to those of ordinary skill in the art in view of the disclosure herein. For example, the devices and methods may include additional components or steps that were omitted from the diagrams and description for clarity of operation. Accordingly, this description is to be construed as illustrative only and is for the purpose of teaching those skilled in the art the general manner of carrying out the present teachings. It is to be understood that the various examples shown and described herein are to be taken as exemplary. Elements and materials, and arrangements of those elements and materials, may be substituted for those illustrated and described herein, parts and processes may be reversed, and certain features of the present teachings may be utilized independently, all as would be apparent to one skilled in the art after having the benefit of the description herein. Changes may be made in the elements described herein without departing from the scope of the present teachings and following claims.

It is to be understood that the particular examples set forth herein are non-limiting, and modifications to structure, dimensions, materials, and methodologies may be made without departing from the scope of the present teachings.

Other examples in accordance with the present disclosure will be apparent to those skilled in the art from consideration of the specification and practice of the invention disclosed herein. It is intended that the specification and examples be considered as exemplary only, with the following claims being entitled to their fullest breadth, including equivalents, under the applicable law.

What is claimed is:

1. An electronic device comprising:
   a number of ports configured to removably receive pluggable modules; and
   processing circuitry comprising a power management engine configured to:
   monitor system properties of the electronic device including determining a maximum number of high-thermal pluggable modules;
   monitor pluggable module properties of any pluggable modules installed in the ports including obtaining per-module thermal properties from each of the pluggable modules indicative of whether the respective pluggable module is a high-thermal pluggable module; and
   dynamically select a high-power mode or a low-power mode for each of the pluggable modules installed in the ports based on the monitored properties, wherein the pluggable module properties comprise per-module power saving configurations comprising information about scheduled downtime; and wherein the power management engine is configured to dynamically select the high-power mode or the low-power mode for each of the pluggable modules based on the per-module power saving configurations.

2. The electronic device of claim 1, wherein the power management engine is configured to monitor port properties, wherein the system properties comprise total power available for the ports, wherein the port properties comprise per-port maximum power, wherein the pluggable module properties comprise per-module maximum power, and wherein the power management engine is configured to dynamically select the high-power mode or the low-power mode for each of the pluggable modules based further on the total power available for the ports, the per-port maximum power, and the per-module maximum power.

3. The electronic device of claim 2, wherein the power management engine is configured to determine, iteratively for each of the ports, whether an unallocated portion of the total power available for the ports exceeds the per-port maximum power.

4. The electronic device of claim 3, wherein the power management engine is configured to determine, iteratively for each of the pluggable modules, whether the per-module maximum power of the respective pluggable modules exceeds the per-port maximum power of the port in which the respective pluggable module is installed.

5. The electronic device of claim 1, wherein the power management engine is configured to dynamically select the high-power mode or the low-power mode in response to one or both of:
 a new pluggable module being installed in one of the ports, and
 the electronic device being turned on.

6. The electronic device of claim 1, wherein the power management engine is configured to, iteratively for each of the pluggable modules:
 determine whether the pluggable module is a high-thermal pluggable module based on the per-module thermal properties,
 in response to the pluggable module being a high-thermal pluggable module, set the pluggable module to the high-power mode or the low power mode based on whether a current number of high-thermal pluggable modules is less than the maximum number of high-thermal pluggable modules.

7. The electronic device of claim 1, wherein the power management engine is configured to monitor port properties including per-port maximum temperatures, wherein the pluggable module properties comprise per-module sensed temperatures; and wherein the power management engine is configured to dynamically select the high-power mode or the low-power mode for each of the pluggable modules based further on the per-module sensed temperatures and the per-port maximum temperatures.

8. The electronic device of claim 7, wherein the power management engine is configured to determine, for each of the pluggable modules, whether the per-module sensed temperature of the respective pluggable module exceeds the per-port maximum temperature of the port in which the respective pluggable module is installed.

9. The electronic device of claim 7, wherein the power management engine is configured to dynamically select the high-power mode or the low-power mode for each of the pluggable modules based on the per-module sensed temperatures and the per-port maximum temperatures periodically.

10. The electronic device of claim 1, wherein the power management engine is configured to determine, for each of the pluggable modules, whether the respective pluggable module is current scheduled for downtime based on the per-module power saving configurations.

11. The electronic device of claim 1, wherein the pluggable modules comprise optical transceivers.

12. The electronic device of claim 1, wherein the per-module thermal properties comprise categorical self-identifications of the pluggable modules as high-thermal pluggable modules or as lower-thermal pluggable modules.

13. The electronic device of claim 12, wherein the categorical self-identifications comprise binary values programmed into the pluggable modules to categorically indicate whether the pluggable modules are high-thermal pluggable modules.

14. The electronic device of claim 1, wherein the per-module thermal properties comprise values quantitatively indicating expected thermal outputs of the pluggable modules.

15. An electronic device comprising:

a number of ports configured to removably receive pluggable modules; and processing circuitry comprising a power management engine configured to:
 monitor system properties of the electronic device, wherein the system properties comprise an airflow direction through the electronic device, a maximum number of high-thermal modules for a first airflow direction, and a maximum number of high-thermal modules for a second airflow direction;
 monitor pluggable module properties of any pluggable modules installed in the ports, wherein the pluggable module properties comprise per-module thermal properties; and
 dynamically select a high-power mode or a low-power mode for each of the pluggable modules based on the airflow direction, the maximum number of high-thermal modules for the first airflow direction, the maximum number of high-thermal modules for the second airflow direction, and the per-module thermal properties.

16. The electronic device of claim 15, wherein the system properties comprise an airflow direction through the electronic device, a maximum number of high-thermal modules for a first airflow direction, and a maximum number of high-thermal modules for a second airflow direction, and wherein the power management engine is configured to determine the maximum number of high thermal modules based on the airflow direction, the maximum number of high-thermal modules for the first airflow direction, and the maximum number of high-thermal modules for the second airflow direction.

17. A method comprising:
monitoring system properties of an electronic device comprising a plurality of ports configured to removable receive pluggable modules, including determining a maximum number of high-thermal pluggable modules;
monitoring pluggable module properties of any pluggable modules installed in the ports, including obtaining per-module thermal properties from each of the pluggable modules indicative of whether the respective pluggable module is a high-thermal pluggable module; and
dynamically selecting a high-power mode or a low-power mode for each of the pluggable modules installed in the ports based on the monitored system properties, port properties, and pluggable module properties;
monitoring port properties of the ports,
wherein the system properties comprise total power available for the ports,
wherein the port properties comprise the per-port maximum power,
wherein the pluggable module properties comprise per-module maximum power, and
wherein the dynamically selecting the high-power mode or the low-power mode for each of the pluggable modules further comprises:
determining, iteratively for each of the ports, whether an unallocated portion of the total power available for the ports exceeds the per-port maximum power; and
determining, iteratively for each of the pluggable modules, whether the per-module maximum power of the respective pluggable modules exceeds the per-port maximum power of the port in which the respective pluggable module is installed.

18. A method comprising:
monitoring system properties of an electronic device comprising a plurality of ports configured to removable receive pluggable modules, including determining a maximum number of high-thermal pluggable modules;
monitoring pluggable module properties of any pluggable modules installed in the ports, including obtaining per-module thermal properties from each of the pluggable modules indicative of whether the respective pluggable module is a high-thermal pluggable module; and
dynamically selecting a high-power mode or a low-power mode for each of the pluggable modules installed in the ports based on the monitored system properties, port properties, and pluggable module properties;
wherein the system properties comprise an airflow direction through the electronic device, a maximum number of high-thermal modules for a first airflow direction, and a maximum number of high-thermal modules for a second airflow direction,
wherein dynamically selecting the high-power mode or the low-power mode for each of the pluggable modules comprises:
determining, iteratively for each of the pluggable modules, whether the pluggable module is a high-thermal pluggable module based on the per-module thermal properties;
determining a maximum number of high thermal modules based on the airflow direction, the maximum number of high-thermal modules for the first airflow direction, and the maximum number of high-thermal modules for the second airflow direction; and
in response to determining that a given pluggable module is a high-thermal pluggable module, determining whether a current number of high-thermal modules equals or exceeds the maximum number of high thermal modules.

* * * * *